United States Patent [19]
Renda

[11] Patent Number: 5,991,836
[45] Date of Patent: Nov. 23, 1999

[54] SYSTEM FOR COMMUNICATING REAL TIME DATA BETWEEN CLIENT DEVICE AND SERVER UTILIZING THE CLIENT DEVICE ESTIMATING DATA CONSUMPTION AMOUNT BY THE SERVER

[75] Inventor: Gregory L. Renda, San Jose, Calif.

[73] Assignee: Network Computing Devices, Inc., Mountain View, Calif.

[21] Appl. No.: 08/850,575

[22] Filed: May 2, 1997

[51] Int. Cl.[6] .............................. G06F 13/14; H04L 12/56
[52] U.S. Cl. .............................. 710/58; 710/60; 709/222; 709/230; 709/301; 709/302
[58] Field of Search .................................. 395/681, 682, 395/200.61, 200.3, 200.52, 200.6, 200.33, 878, 880; 709/301, 302, 231, 230, 222; 710/58, 60

[56] References Cited

U.S. PATENT DOCUMENTS

| | | | |
|---|---|---|---|
| 5,572,672 | 11/1996 | Dewitt et al. ...................... | 395/184.01 |
| 5,625,678 | 4/1997 | Blomfield-Brown ...................... | 379/93 |
| 5,687,373 | 11/1997 | Holmes et al. .......................... | 395/682 |
| 5,729,573 | 3/1998 | Bailey et al. ............................ | 375/222 |
| 5,790,114 | 8/1998 | Geaghan et al. ......................... | 345/326 |
| 5,819,043 | 10/1998 | Baugher et al. ................... | 395/200.52 |

FOREIGN PATENT DOCUMENTS

WO 94/18771  8/1994  WIPO ............................ H04L 12/56

Primary Examiner—Thomas C. Lee
Assistant Examiner—Rehana Perveen
Attorney, Agent, or Firm—Blakely Sokoloff Taylor & Zafman, LLP

[57] ABSTRACT

An improved method and apparatus for providing multimedia communication between and client device and a server. The improved method and apparatus allows for communication of information, such as audio or video information from an application program to be communicated through a standard application program interface to a device driver which, in turn communicates the information over a network to a server.

16 Claims, 6 Drawing Sheets

SYSTEM FOR COMMUNICATING REAL TIME DATA BETWEEN CLIENT DEVICE AND SERVER UTILIZING THE CLIENT DEVICE ESTIMATING DATA CONSUMPTION AMOUNT BY THE SERVER

BACKGROUND OF THE INVENTION

1. Field of the Invention

The present invention relates to the field of computer networks and more particularly to communication between clients and servers in the network.

2. Description of the Related Art

Many computer programs applications have been written to execute on computer platforms which include a processor and real time input/output (I/O) devices such as monitors for display of video and speakers for producing sound. The computer systems typically execute an application program interface (API) which interfaces with the application programs and a device driver which interfaces with the API and the I/O device.

The application programs are written to interface with a particular API. Rewriting the applications to interface with some other API would be time-consuming and expensive at best. More likely, significant commercial issues would be presented in attempting to get application program vendors to rewrite the applications to interface with new API's and, as a result, the may application programs would simply not be rewritten. A result could be that if a new computer architecture was introduced, the end user would have a very limited selection of application programs and this in turn would limit the market for the new computer architecture.

Application programs which require access to realtime I/O devices, especially networked applications, present unique problems especially when compared to non-realtime I/O such as display of graphics (which may be simply buffered and are not time dependent). Briefly, in the X architecture, a workstation 102 may be executing a client process 101 which performs real-time output where the real-time output is displayed on a server device (such as 104, 105, 106) coupled with the client process over a network Prior art implementation for communication of information from a client to a server in an X architected implementation have generally provided for entirely new applications, or rewritten applications to interface with a special purpose API used for communicating over the network. An example of this is illustrated with reference to FIG. 3 which illustrates an application executing on a client and communicating through a network audio API over a network to an audio server. The network audio API is a special purpose API written to allow networked communication. Application programs executing on the client must be designed to interface with this special purpose API. This API may be referred to as a "network API".

The X Architecture and NCs

It is worthwhile to provide some background on the X architecture. The X Window System was developed originally at Massachusetts Institute of Technology (MIT) to fulfill a need for a distributed, hardware independent, user interface platform. The architecture of the X Window System is based on the client-server model. A single process, known as a server, is responsible for all input and output devices. The server creates and manipulates windows on a screen, produces text and graphics, and handles input and output devices such as a keyboard or mouse. The X server typically executes on a relatively low performance workstation or personal computer. An application program executes on another device referred to as the client.

FIG. 1 illustrates an X client process 101 executing on a workstation 102. The workstation 102 communicates over a network connection 103 with X servers executing on data terminal equipment (DTE) 104,105 and 106. The network connection 103 may support any of a number of network protocols including for example TCP/IP.

The distributed X architecture allows the server and clients to execute on separate machines located anywhere on the network.

More recently, the concept of network computers (NCs) has been introduced. NCs, in architectural concept, are essentially X servers. With the popularity of the internet, NC have come to be viewed as a relatively low cost computer which allows an easy software upgrade path as new generations of software become available. A new generation of software may be provided to allow the X client to offer additional services to the NC without need to go to the expense and trouble of installing new software on the NC.

Device Drivers

FIG. 2 illustrates aspects of a typical personal computer. The computer is executing an application program 201 (for example, the application may be a game program or other program requiring numerous input/output devices). The application program 201 interfaces with a local device high level application program interface (API) 202 such as the Windows™ media control interface (MCI). The local device API, in turn, interfaces with one or more device drivers 203. The device drivers 203 are typically supplied by the manufacturer of the device being controlled by the device driver 203. For example, in the illustration of FIG. 2, the device driver 203 controls audio card 204. Audio card 204 in turn controls audio input/output devices such as microphone 205 and speaker 206.

Certain types of data require presentation in time ordered, relatively equal intervals. Such data is sometimes termed isochronous data. Examples, include audio and graphics data. Typically, in the case of output data (e.g., driving the speaker) the card 204 will receive the data to be played and process it eventually resulting in sound being produced by the speaker 206. Just prior to the card 204 completing processing of any particular piece of data, the card 204 notifies the device driver and the device driver supplies more data.

As can be seen, the architecture described in connection with FIG. 2 assumes an operating system environment which expects local hardware, There is, in fact, a very large installed base of computer systems and application programs using the architecture described by FIG. 2.

It would be useful to allow NCs to use application programs written to execute in the computer architecture environment described in connection with FIG. 2. One approach has been to redesign at least the application program interface (API) software to provide commands to the remote device instead of to the local input/output card. This type of an API may be referred to as a "networked API" and this type of approach is discussed in greater detail in connection with FIG. 3.

The Network Audio System

One approach to supporting input/output devices in X environments is described in *Fulton and Renda*, The Network Audio System, Make Your Applications Sing (as well as dance)!, The X Resource, Issue IX, January, 1994, O'Reilly & Associates (the "NAS Reference"). The NAS Reference describes a system developed by Network Computing Devices of Mountain View, Calif. (the assignee of the present application) for playing, recording and manipulating audio data over a network. The NAS Reference describes using the client/server model to split applications programs from specific hardware drivers. FIG. 3 illustrates the NAS architecture. This system is an example of a system in which a special purpose network API has been written, and the application programs must be written to interface with the network API.

Another system for managing input/output in a client/server environment is provided by the AudioFile, a device-independent network transport audio server described at http://www.tns.Ics.mit.edu/vs/audiofile.html.

Each of the prior art techniques for giving users access to real-time input/output devices over a network suffers from the need to rewrite applications to use new APIs designed specifically to access such devices over a network. This restriction precludes the use of existing industry standard applications.

Further, each of these solutions does not allow for efficiently measuring data flow in the system.

Thus, what is needed is an improved client/server communication system which gives users the ability to access real-time input/output devices over a network using existing industry standard application programs, such as Microsoft Windows applications, which are designed to access local real-time devices using existing standard application program interfaces, such as the standard Microsoft Windows API. It is further desirable for such an improved communication system to allow for the efficient measurement of data flow in the system.

SUMMARY OF THE INVENTION

A method for communicating real time information, such as audio or video information, between a client and a server is described in which an application program communicates data representing a real time data stream to a real time application program interface (API). The API then communicates the data segment to a device driver and the device driver communicates the data segment over a network to the server. In addition, the present invention provides a method for allowing a client to compute an estimate of the amount of data consumed by a server based on time and a data consumption rate.

These and other aspects of the present invention will be described in greater detail in the detailed description and with reference to the drawings.

Figure 1:
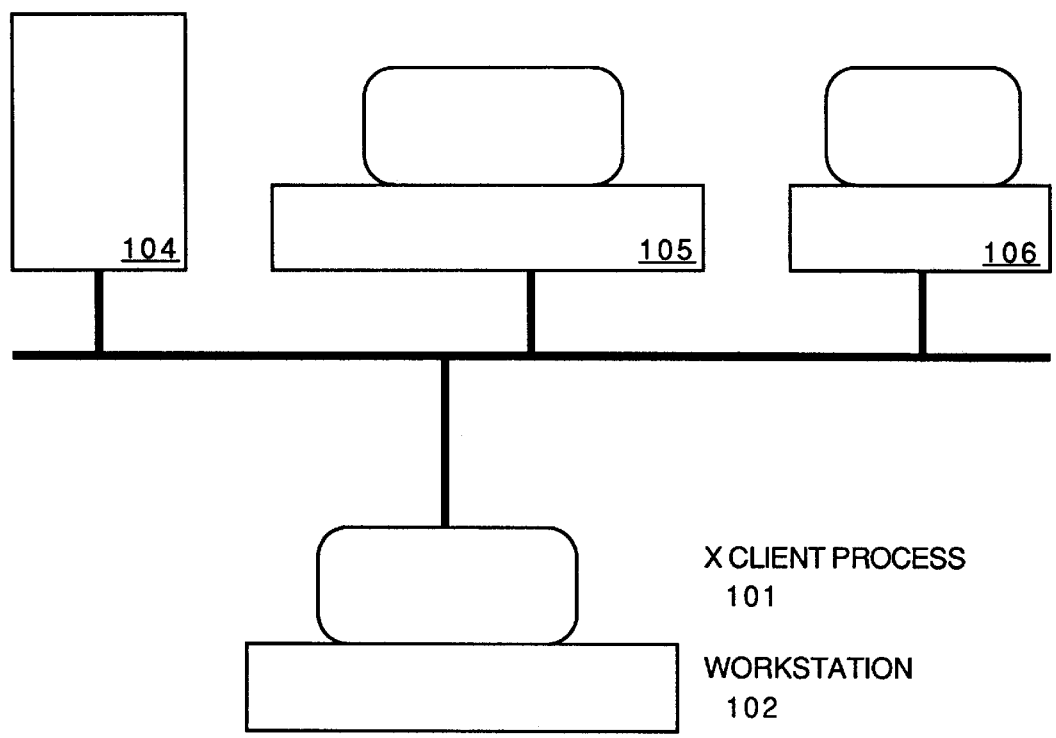
FIG. 1 illustrates a client/server architectural model.
Figure 2:
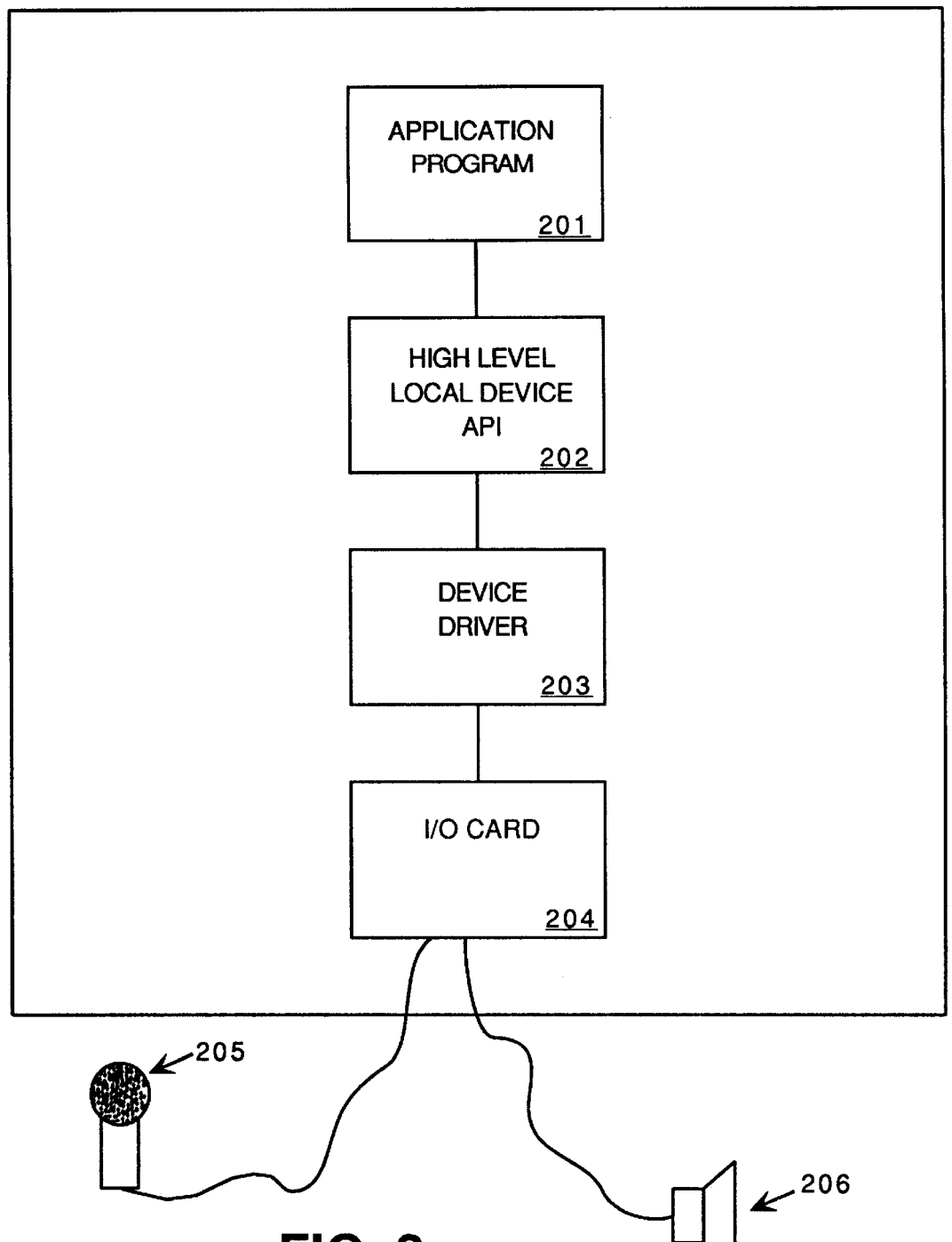
FIG. 2 is a conceptual illustration of a prior art computer system architecture including an application program, an API, a device driver and an input/output card.
Figure 3:
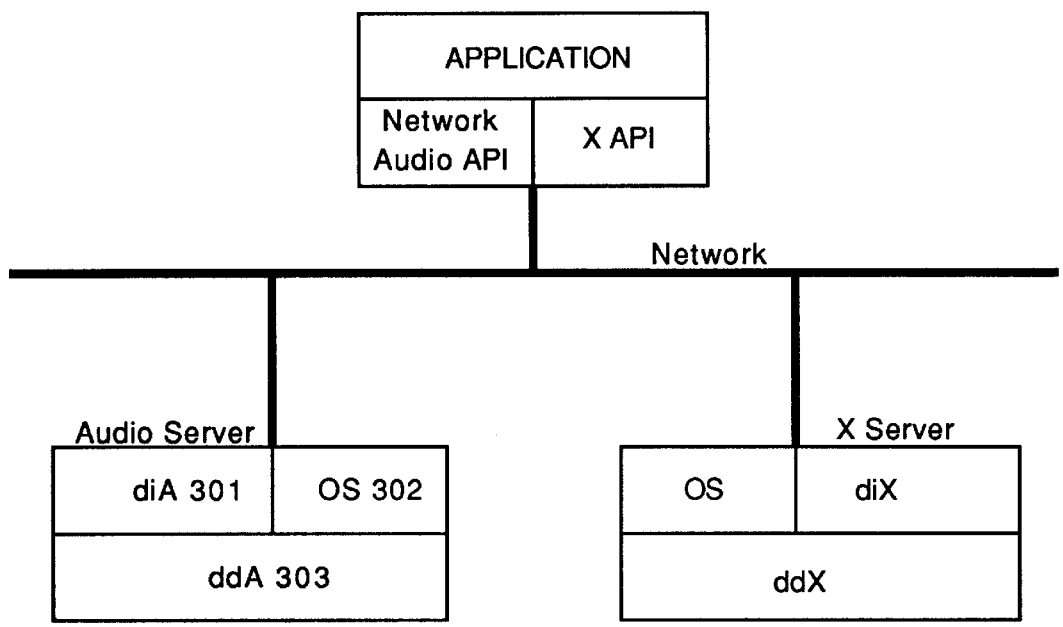
FIG. 3 illustrates use of the Network Audio System architecture.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF THE EMBODIMENTS THE PRESENT INVENTION

Figure 4:
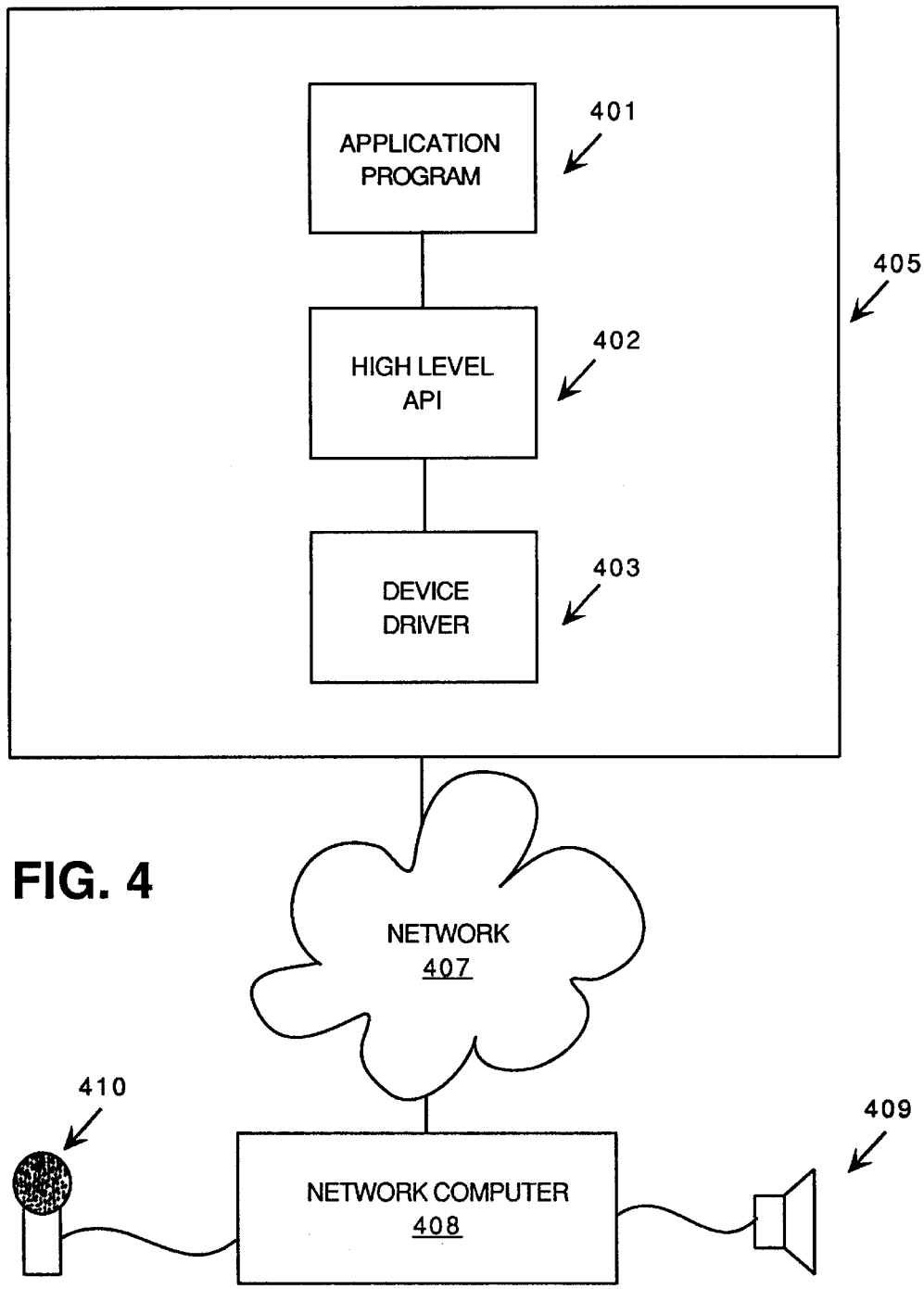
FIG. 4 is an overall diagram of a network such as may utilize the present invention.

FIG. 4 provides illustrates a network as may implement the present invention. In the example, an application 401 is executing on a client 405. The application may, advantageously be any existing application program, for example a program designed to execute in the Microsoft Windows™ environment.

In the example we will describe, the application 401 generates a real time data stream representing audio signals. Alternatively, the application program may be generating a real time data stream representing any other type of real time data, for example, video.

The real time data stream is communicated to a high level application program interface (API) 402. Advantageously, the API may be an existing API such as the Windows Media Control Interface (MCI). Thus, no changes are required to be made to existing application programs designed to interface with existing API's in order to allow them to execute in the client-server networked environment described herein.

The API 402 communicates the data to a device driver 403. In the embodiment of the present invention, the device driver 403 is programmed to communicate over the network 407. Network 407 may be any of a number of networks, including for example a local area network or a distributed network such as the internet. A network computer or server 408 is coupled in communication with the network and receives the data from driver 403. This data is ultimately used, in the described example, to drive speaker 409. Of course, as was mentioned, in other examples, the data may be other real time data such as video. In still other examples, instead of controlling an output device, an input device such as a microphone 410 may be controlled.

Thus, by designing the device driver 403 to interface with existing high level API's 402, advantageously, an existing library of application programs may be executed in a client server environment.

In certain embodiments of the invention, it may be useful for the client 405 to be able to estimate the amount of data consumed (i.e., played on the speaker 409 in the case of audio data, or displayed on a display in the case of video data) by network computer 408. The ability to estimate the amount of data consumed may be useful, for example, in order to allow the client to determine when additional data should be transmitted to the server, to allow synchronization of audio and video information, or to allow display of graphical user interface (such as shown by FIG. 6) on the client showing the amount of data consumed.

Figure 5:
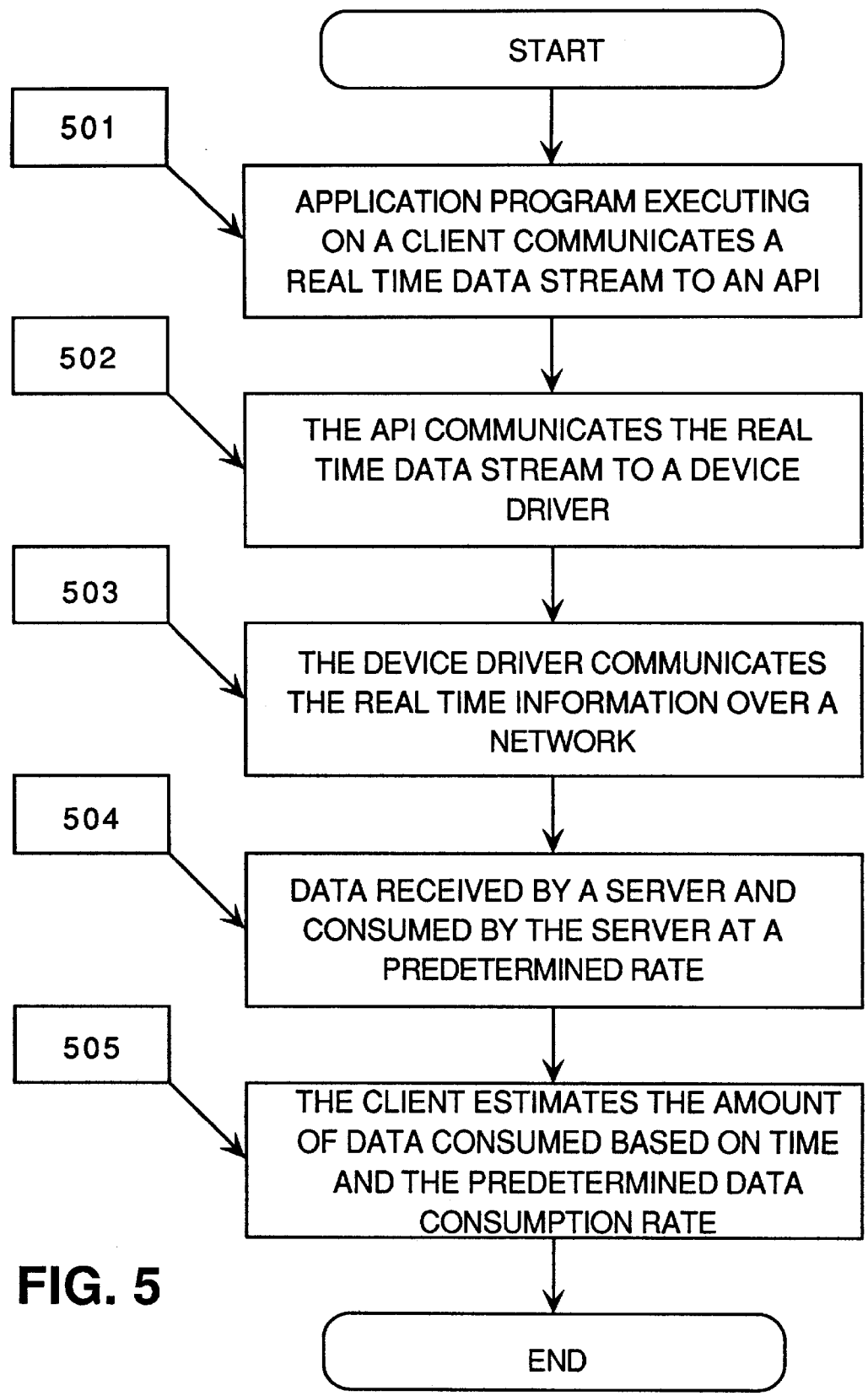
FIG. 5 is a flow diagram illustrating a method of the present invention.

Therefore, as is illustrated by FIG. 5, the present invention provides for a method of communicating information between a client and a server. The method allows for the client to estimate the amount of data consumed by the server. In the described method, an application program is executing on the client, block 501, which communicates a real time data stream to an API. The application program may be any existing application program and the API may be any existing API. The API communicates the real time data stream to a device driver, block 502. The device driver communicates the real time information over a network, block 503 and the data is received by the server. The server consumes the data at a predetermined rate, block 504. The predetermined rate. The client estimates the amount of data consumed by the server based on time and the predetermined data consumption rate, block 505.

For example, in one embodiment of the present invention, the device driver is aware of the server's data sampling rate of audio data. Thus, simply by way of example, if device driver transmits 1000 bytes of audio data and is aware that the sampling rate is 100 bytes per second, the device driver may estimate the amount of data consumed based on the amount of time passed since the data was transmitted and the data sampling rate (e.g., if 5 seconds has passed, 500 of the 1000 bytes would have been consumed)

Figure 6:
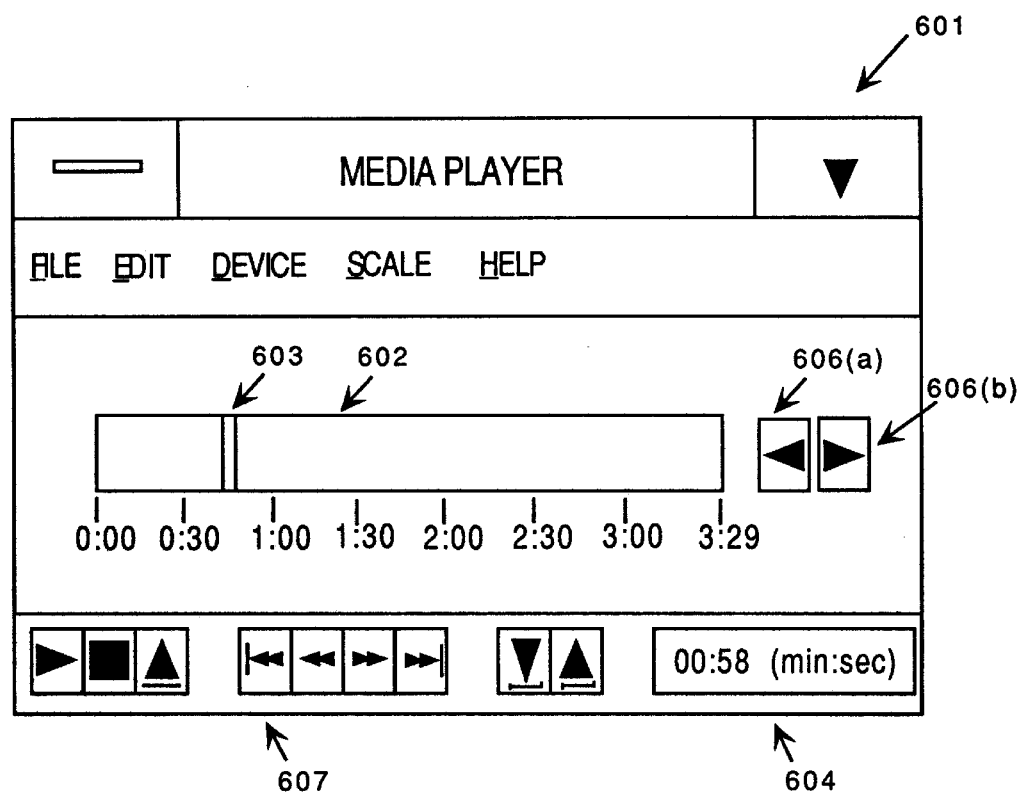
FIG. 6 is an illustration of a graphical use interface such as may be utilized by the present invention.

As one use of the present invention, a graphical user interface 601 as illustrated by FIG. 6 may be displayed on the client. The client may compute an estimated time to complete processing of the information (audio, video, etc.) and display a time line as shown by 602 showing the estimated total time to complete processing of the information. In the illustrated example, the estimate time to complete processing of the information is 3 minutes, 29 seconds (3:29). The time estimate is computed based the estimation technique just described.

The graphical user interface further comprises a bar 603 which indicates the relative amount of information processed. In addition, an elapsed time counter is displayed, 604. Buttons 606(*a*) and 606(*b*) allow for moving forward or backward in processing of the information. Buttons 607 may also be used to fast forward, rewind, stop, start, and otherwise manipulate processing of the information.

Alternatives to the Preferred Embodiment of the Present Invention

There are, of course, alternatives to the described embodiment which are within the reach of one of ordinary skill in the relevant art. The present invention is intended to be limited only by the claims presented below.

What is claimed is:

1. A method of communicating information between a client and a server comprising:
    a) an application communicating a data segment representing a real time data stream to a local device application program interface (API);
    b) said API communicating said data segment to a device driver;
    c) said device driver communicating said data segment over a network
    d) said client computing an estimate of an amount of said data segment consumed by said server.

2. The method as recited by claim 1 wherein the application is executing on a client device.

3. The method as recited by claim 1 wherein said real-time data stream represents audio data.

4. The method as recited by claim 1 wherein said real-time data stream represents video data.

5. The method as recited by claim 1 wherein said data segment is communicated over said network through a network API.

6. The method as recited by claim 1 wherein said data segment is communicated to a server over said network.

7. The method as recited by claim 1 wherein said computation is based on time and a data consumption rate.

8. A method of communicating information between a client and a server comprising:
    a) an application executing on a client communicating a data segment representing a real time data stream to a local device application program interface (API);
    b) said API communicating said data segment to a device driver;
    c) said device driver communicating said data segment over a network through a network API to server; and
    d) said client computing an estimate of the amount of said data segment consumed by said server.

9. The method as recited by claim 8 wherein said computation is based on time and a data consumption rate.

10. A method of communicating information between a client and a server comprising:
    a) the client communicating a first segment of data to the server over a network communication link; and
    b) the client computing the amount of the data segment consumed by the server.

11. The method as recited by claim 10 wherein said computation is an estimate based on time and a data consumption rate.

12. The method as recited by claim 10 where said client is executing an application program and said application program communicates said data segment to a real time application program interface.

13. The method as recited by claim 10 further comprising displaying a graphical user interface allowing display of the computed amount of data consumed by the server.

14. A client coupled with a network, the client comprising:
    an application program executing on said client and generating real time data;
    a local device application program interface (API) executing on said client and communicating real time data with said application program; and
    a device driver executing on said client and communciating with said application program interface and said network, wherein said client computes an estimate of an amount of said real time data consumed by a server.

15. The client as recited by claim 14 wherein said real time data is video data.

16. The client as recited by claim 14 wherein said real time data is audio data.

\* \* \* \* \*